United States Patent

[11] 3,543,774

| | | |
|---|---|---|
| [72] | Inventor | George Oliver Trasp<br>Aliquippa, Pennsylvania |
| [21] | Appl. No. | 859,018 |
| [22] | Filed | Sept. 18, 1969<br>Continuation-in-part of application Ser. No. 780,484, Dec. 2, 1968, abandoned. |
| [45] | Patented | Dec. 1, 1970 |
| [73] | Assignee | Homestead Industries, Inc.<br>a corporation of Pennsylvania |

[54] VEHICLE WASHING APPARATUS
23 Claims, 13 Drawing Figs.

[52] U.S. Cl. .................................................... 134/57,
134/123, 134/181
[51] Int. Cl. ...................................................... B60s 3/04
[50] Field of Search .......................................... 134/45, 57,
123, 180, 181; 15/(CCP)

[56] References Cited
UNITED STATES PATENTS

| 2,676,600 | 4/1954 | Vani et al. ..................... | 134/123 |
| 2,756,759 | 7/1956 | Swain ............................ | 134/123 |
| 2,854,680 | 10/1958 | Wilson .......................... | 134/123 |
| 3,072,130 | 1/1963 | Grabenhorst .................. | 134/123 |
| 3,398,755 | 8/1968 | Hudson et al. ................. | 134/123 |

*Primary Examiner*—Robert L. Bleutge
*Attorney*—Carothers and Carothers

ABSTRACT: A vehicle washing apparatus for washing the surface of the vehicle having an elongated track supported horizontally above the vehicle to be washed. A carriage is provided for reciprocal motion along the track and to support a spray head mechanism which includes an inverted L-shaped spray unit adapted to extend above and partly across the vehicle to be washed as well as along one side thereof. A drive means is provided to control the reciprocal movement of the carriage along the elongated track through a designated path of travel. Arcuate travel guide means are disposed on the spray head mechanism operative by the drive means when the carriage is at each end of its path of travel to rotate the L-shaped spray unit 180° around the ends of the vehicle to be washed to simultaneously cause the L-shaped spray unit when so rotated to subscribe a substantially rectangular U-shaped path around the end of the vehicle.

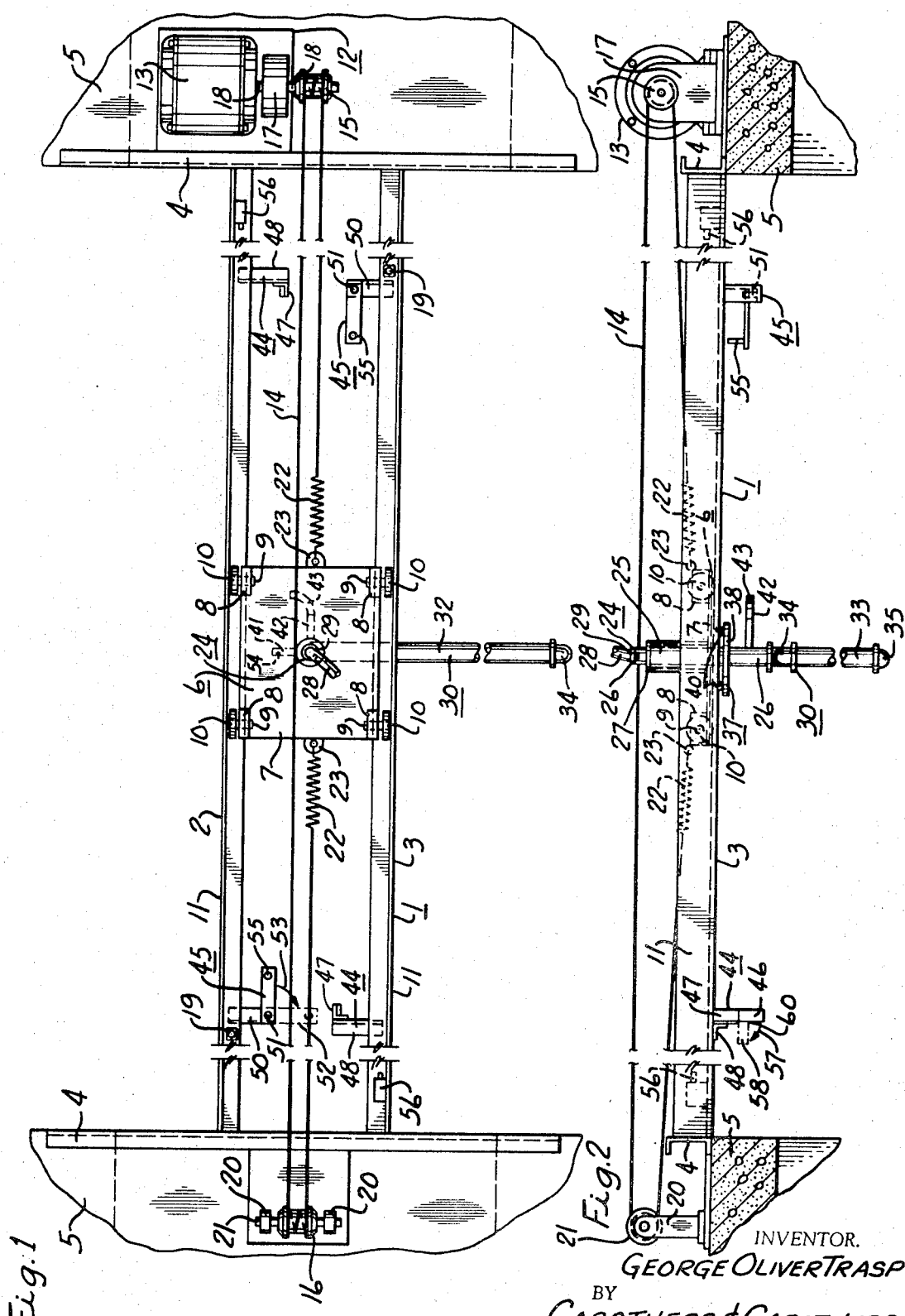

INVENTOR.
GEORGE OLIVER TRASP
BY
CAROTHERS & CAROTHERS
HIS ATTORNEYS

INVENTOR.
GEORGE OLIVER TRASP
BY
CAROTHERS & CAROTHERS
HIS ATTORNEYS

Patented Dec. 1, 1970 3,543,774
Sheet 5 of 7
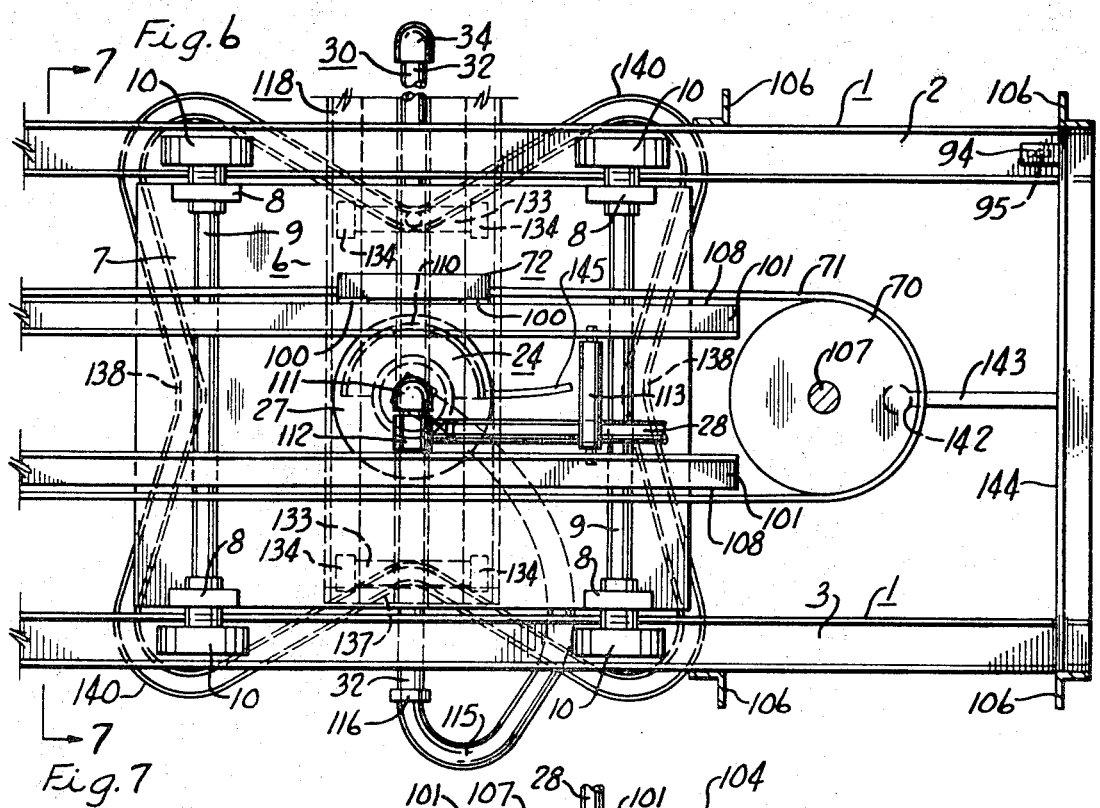
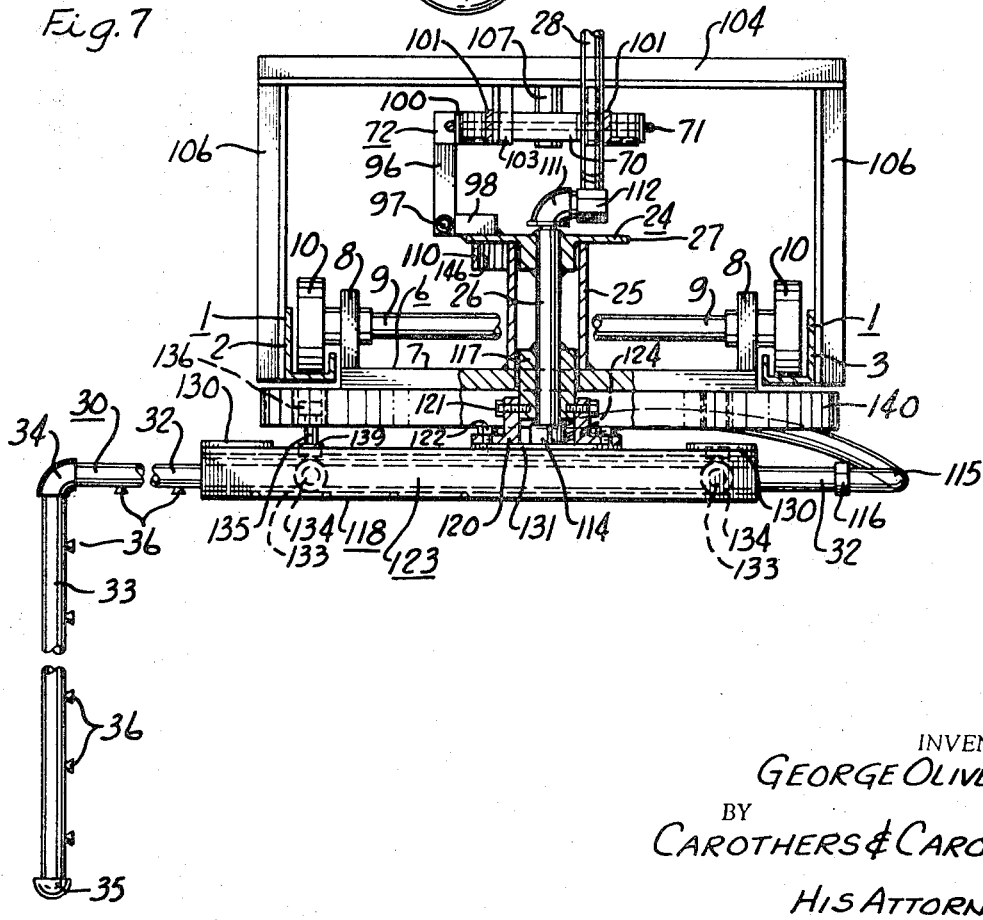
INVENTOR.
GEORGE OLIVER TRASP
BY
CAROTHERS & CAROTHERS
HIS ATTORNEYS

INVENTOR.
GEORGE OLIVER TRASP
BY
CAROTHERS & CAROTHERS
HIS ATTORNEYS

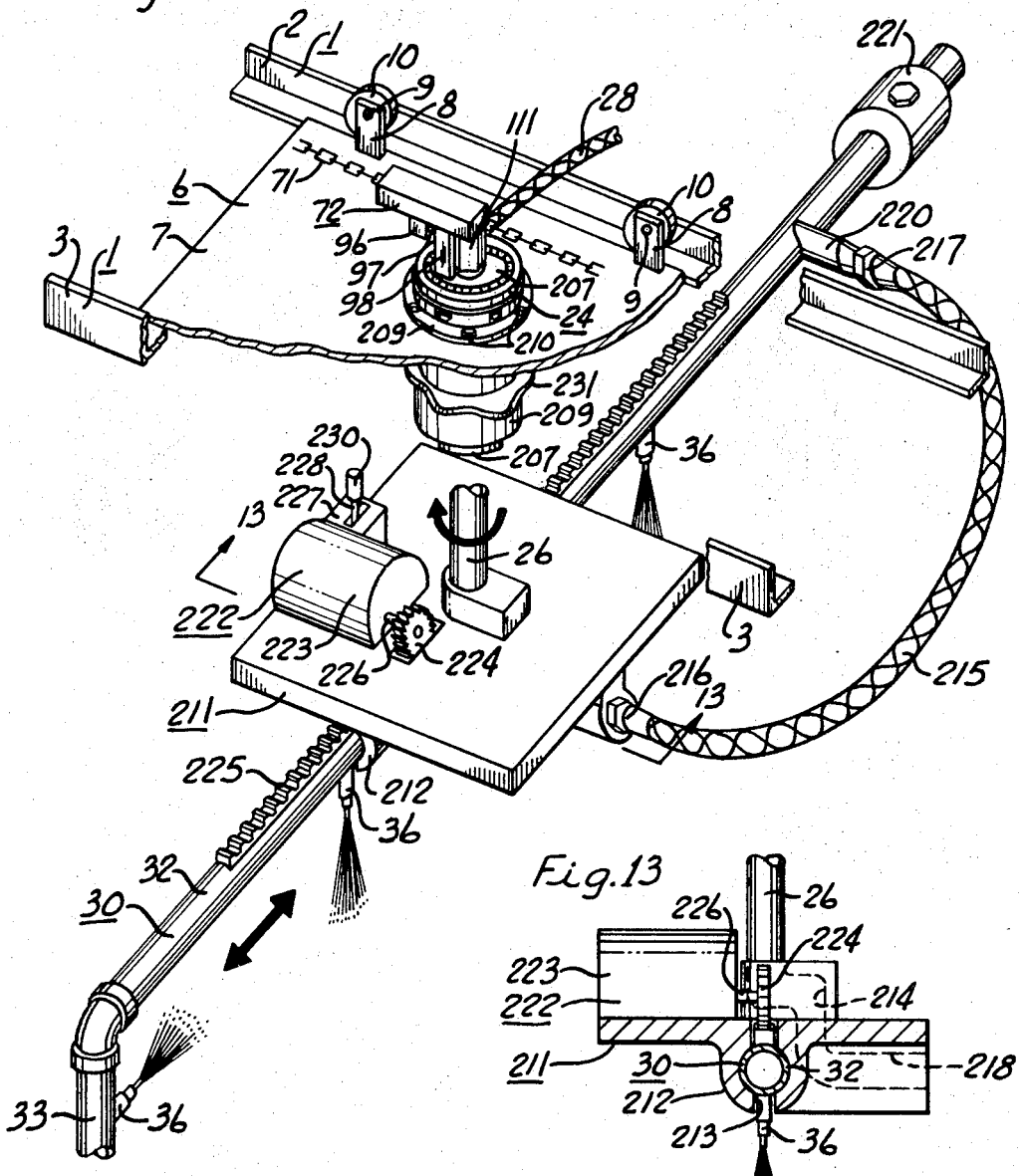

VEHICLE WASHING APPARATUS

This application is a continuation-in-part of applicant's copending U.S. Pat. application Ser. No. 780,484, filed Dec. 2, 1968, which is now abandoned.

BACKGROUND OF INVENTION

1. Field of Invention

This invention relates principally to liquid cleaning apparatus for washing vehicles (Class 134-123) and more particularly is directed to a vehicle washing apparatus of the spray type having guided or propelled translating distributor means reciprocally supported on an overhead track or guideway (Class 239-185).

2. Description of the Prior Art

As is well known to one knowledgeable in the vehicle washing apparatus art, there has been extensive teachings in the prior art with respect to vehicle washing apparatus which may be generally referred to as "the tunnel type" and "the single station type". This invention is primarily concerned with the single station type.

Examples of the single station type are the U.S. Pats. to Wilcox No. 2,558,472 (134-100), Falkenberg No. 2,764,893 (74-25) and Phillips No. 2,910,993 (134-123). An example of single station type operated through a fluid motor control means is Italian Pat. 627,777 of Nov. 9, 1961 (134-123). Each of these prior art references show the utilization of an overhead conveyor or drive system for an overhead car wash carriage which supports an inverted U-shaped spray unit having a series of nozzles on its vertical and horizontal portions. The carriage is driven along an overhead track and the motor means to drive the inverted U-shaped spray unit is controlled to be reversed in order that the carriage supported on the track will move through a designated reciprocal path of travel on the track. Such overhead track systems can consist of a single track or a double track, each of the above mentioned references showing a double track type.

Although the vehicle washing apparatus disclosed in each of these references is effective for washing the sides of the vehicle, there is no disclosure of positive automatic effective means to provide a structure or method to adequately or effectively wash the forward and rearward ends of the vehicle.

This is not to say that attempts have not been made in the prior art to solve this problem. Examples of such attempts are shown in the patent reference to Grabenhorst U.S. Pat. No. 3,072,130 (134-99) and Axe et al. U.S. Pat. No. 3,299,901 (134-123) references shows a single track system for supporting a carriage which in turn supports an inverted substantially L-shaped spray unit adapted to extend above and partly across the vehicle being washed and along one side thereof. Guide means are provided on the spray unit to effectively move the spray unit completely around the vehicle to be washed, thus providing a spray unit that not only washes the sides and top of the vehicle but also washes the forward and rearward ends. However, the Grabenhorst reference is of manual operation and therefore subject to abuse, ineffective use and undesirable economical necessities such as labor costs.

The same is true of the second above mentioned patent reference to Axe et al. who provides an elongated dual track to support a first carriage upon which is a second set of dual tracks to support a second carriage. The concurrent operation of both the first and second carriages along their respective tracks permits the inverted L-shaped spray unit shown in this reference to be manually motivated around the ends of the vehicle to be washed.

Although these two patent references show a vehicle washing apparatus capable of washing the entire surfaces of the vehicle, such manual operated equipment is highly undesirable in today's car washing industry where there now is a high demand for vehicle washing apparatus of the single station type which is fully automatic so that time is saved for the owner or operator of the vehicle in the time required to wash his vehicle and the owner and operator of the vehicle may, himself, automatically control and operate such vehicle washing apparatus.

To this end, the prior art has reached a stage where vehicle washing equipment of the single station type and employing an inverted L-shaped spray unit adapted to extend above and partly across the vehicle being washed and along the side thereof has been automated in order to permit washing the vehicle in a minimum time as possible and without the expense of operation encountered in vehicle washing apparatus of the tunnel type. Two examples of such equipment shown in the prior art are Vani et al. U.S. Pat. No. 2,676,600 (134-123) and Tompkins U.S. Pat. No. 2,896,857 (239-185).

The Tompkins reference shows a continuous substantially rectangular track system upon which a carriage is supported with an inverted L-shaped spray unit suspended below the carriage. The vehicle to be washed is driven under the overhead track and the carriage and spray are set into operation causing the carriage to circumscribe the rectangular track for one revolution and wash all surfaces of the vehicle. The carriage may be operated for another revolution for the purpose of rinsing. A principal drawback of this structure is utilization of a closed loop track which renders it difficult for the carriage to maneuver each of the four arcuate corners of the substantially rectangular track. Further, the dimensional limitations of the closed loop track system utilized in this type of vehicle washing apparatus limits the ability of the spray unit to actually circumscribe a path, the outline of which is that of the side and end contour of the modern day vehicle. It is well known that vehicles come in many sizes and shapes extending from very small compact little cars commonly referred to as "bugs" up to and including large luxurious automobiles. Truck vehicles are the next class of larger vehicles. In view of the difficulty of the vehicle washing carriage to maneuver the arcuate corners of such a rectangular closure track system, it becomes necessary to insure a large arcuate corner section which ultimately interferes with the washing performance of the equipment since the L-shaped spray unit cannot be maintained at a desired distance relationship for every type of vehicle because it cannot be maintained at an equal distance from the vehicle as the carriage maneuvers around the forward and rearward ends of the vehicle. It is for this reason that the manually operated equipment as depicted in the above mentioned patent references to Grabenhorst and Axe et al. is ultimately more successful, although manually operated, since guide means are provided in these patent references to maintain the L-shaped spray unit a predetermined distance from the surface of the vehicle to be washed.

The problem of maintaining a uniform distance between the L-shaped spray unit and the vehicle with respect to washing the forward and rearward ends of the vehicle is presented in the patent reference to Vani et al. Vani provides a vehicle washing apparatus having a single track in the form of an I beam upon which is supported a carriage and supported from either side of the carriage are inverted L-shaped spray units adapted each to extend above and partly across the vehicle to be washed as well as along a side thereof. Vani et al. in FIG. 3 clearly discloses the pattern of the two inverted L-shaped spray units, which units upon approaching either end of the track are swung toward and away from each other in order to bathe and wash the forward and rearward ends of the vehicle. However, as depicted in the above mentioned FIG., an adequate washing of all surfaces of the vehicle is not accomplished in view of the fact that the inverted L-shaped spray units, while partly transversing the ends of the vehicle, do not wash efficiently and effectively, the entire vehicle ends since the spray units of Vani cannot traverse entirely around the ends of the vehicle to be washed. Further, the Vani spray units, due to the angularity of their points of pivot relative to the carriage, are caused to be pivoted away from the ends of the vehicle a greater distance than that normally maintained when the units are traversing along the vehicle sides. This distance of the nozzles of the L-shaped spray unit relative to the surface of the vehicle may be as much as two to five times more at the ends of the vehicle as compared to the same distance along the sides thereof. As above mentioned, the same problem exists in the closed loop track system of Tompkins.

Present day automobiles are basically rectangular in overall general dimensions and in the development of vehicle washing apparatus, it becomes imperative to have such apparatus operate in the most effective manner in washing the surfaces of the vehicle. To this end, an L-shaped spray unit to be the most effective should subscribe a path most nearly like the contour of the vehicle to be washed. The present invention is directed to vehicle washing apparatus incorporating an inverted L-shaped spray unit adapted to subscribe a substantially rectangular path around the entire vehicle to be washed without the utilization of or necessity for a closed loop track system.

SUMMARY OF INVENTION

The present invention is directed to automatically operated vehicle washing apparatus wherein the above mentioned disadvantages are eliminated and the need for a closed loop track system is also eliminated in favor of the more economically acceptable single elongated track system which is supported horizontally above the vehicle to be washed and provides for an L-shaped spray unit capable of traversing along the sides and around the ends of the vehicle with a uniform distance maintained between the vehicle surfaces and L-shaped spray unit nozzle medium.

In essence, the invention has its principal object residing in a vehicle washing apparatus which utilizes the highly desirable spray head mechanism which includes and inverted L-shaped spray unit adapted to extend above and partly across the vehicle being washed and along one side thereof wherein this L-shaped spray unit circumscribes the entire vehicle including the ends of the vehicle to be washed without sacrificing a quality wash job by maintaining the wash nozzles positioned on the L-shaped spray unit an equal and uniform distance from the sides and end portions of the vehicle as well as spray nozzles on the unit maintained squared to a position normal to the surfaces of the vehicle to be washed as the unit proceeds around the entire vehicle, this all accomplished without utilizing the more expensive closed loop track type car wash system. Thus, the principal feature of the present invention is the utilization of a single track system upon which is supported a carriage for a reciprocal movement through a designated path of travel on the track, the carriage supporting an inverted L-shaped spray unit, the L-shaped spray unit comprising a part of an entire spray head mechanism which includes arcuate travel guide means to rotate the L-shaped spray unit in a substantially rectangular path 180° around each end of the vehicle to be washed when the carriage is at each end of its reciprocal path of travel.

A further principal feature of the present invention resides in arcuate travel guide means of the spray head mechanism to assist the latter in rotational movement of the L-shaped spray unit in its circumscribing motion in a rectangular U-shaped path 180° around the ends of the vehicle. This type of path movement is highly desirable since today's cars are substantially rectangular in plan view contour.

In the present invention the arcuate travel guide means may comprise cam guide means which may take the form of primary and secondary cam arms secured to the spray head mechanism at a position substantially above the inverted L-shaped spray unit. As the carriage proceeds along the elongated track, the primary cam arm intercepts a catch arm adjacent one end of the track causing the L-shaped spray unit to initially circumscribe and complete an arcuate distance 90° whence the movement of the carriage is reversed and the secondary cam arm secured to the spray head mechanism contacts a second or stationary arm supported adjacent each end of the track which causes the L-shaped spray unit to circumscribe a second arcuate distance 90° as the carriage digresses from the end of the track.

In another form, such cam guide means consists of a closed loop trackway secured to the bottom of the carriage. A rotatably supported second or undercarriage is supported beneath the first carriage and has alined roller means to reciprocally support the L-shaped spray unit. A guide which may be in the form of a roller is also secured to the L-shaped spray unit for travel in the trackway so that as the spray unit circumscribes 180° arcuate distance around each end of the vehicle to be washed, the guide roller guided through the unique closed loop trackway causing the L-shaped spray unit to circumscribe a substantially rectangular path while moving through this arcuate distance.

The form of the closed loop trackway is difficult to descriptively explain but is referred to as a "double three", the ends of which are secured together. Further, the closed loop trackway may also be regarded as having a configuration substantially similar to an epicycloid having four cusps. Thus, generically the closed loop trackway may be referred to as substantially quadepicycloidal.

Means may be disposed within the path of travel of the carriage along the elongated track to cooperatively intercept the arcuate travel guide means of the spray head mechanism. Thus, at each end of the path of travel of the carriage on the track, this means is positioned to extend longitudinally relative to the track in order to secure and stabilize the carriage and as a result aid to guide or insure the proper movement of the L-shaped spray unit in its circumscribing 180° path around the ends of the vehicle.

In the case of the primary and secondary cam arms on the spray head mechanism comprising the arcuate travel guide means, this means disposed in the path of travel of the carriage may be in the form of the already mentioned catch arm and second or stationary arm both of which are supported from and adjacent of each end of the track. The catch arm which cooperates with the primary cam arm is supported from the track for biased arcuate movement in a horizontal plane so that upon interception of the primary cam arm with the catch arm, there is simultaneous rotation of each in the same arcuate direction an arcuate distance of substantially 90°. As the carriage digresses from the end of its path of travel, the secondary cam arm which has a right angled forward section which engages the stationary arm the latter of which causes the L-shaped spray unit to move through an additional arcuate distance of substantially 90°. Thus, the action of the primary and secondary cam arms together with the catch arm and stationary arm causes the L-shaped spray unit to circumscribe a substantially rectangular path 180° around the ends of the elongated track and around the ends of the vehicle to be washed.

In the second mentioned form or embodiment, the means disposed within the carriage path of travel may comprise a longitudinally extending bar in alined relationship with the carriage track and extending from the ends of the carriage path of travel. A roller guide is positioned on the end of each of these bars which intercepts the movement of the carriage by being received in a semicircular carriage stabilizing guide lip which is concentrically mounted for rotational movement with the second carriage on the top of the carriage. The stabilizing guide lip is part of the arcuate travel guide means. The principal feature of the roller guide is to be received within the stabilizing guide lip and travel therealong as the L-shaped spray unit supported by the second carriage beneath the main vehicle wash carriage is rotated 180° around the vehicle end. Thus, the roller guide in cooperative relationship with the stabilizing guide lip acts to stabilize the carriage while the same is positioned at each end of its path of travel while the drive means is responsible for the guide roller secured to the L-shaped spray unit to properly travel along the closed loop trackway.

In a third and preferred form of the arcuate travel guide means for the L-shaped spray unit is comprised a rotary crank arm unit secured to the wash carriage and the L-shaped spray unit but coupled to be rotated by the second or undercarriage which is rotatably supported from beneath the wash carriage.

As the carriage reaches the end of its path of travel, the undercarriage is caused to be rotated an arcuate distance of 180° which causes the crank arm unit, due to a gear arrangement between the undercarriage and the crank arm unit of a 4 to 1 ratio, to rotate two complete revolutions, one such revolution completed after the undercarriage has rotated an arcuate distance of 90° and the second revolution being completed after the undercarriage has rotated the final arcuate distance of 90°. The crank arm unit, being connected to the L-shaped spray unit will, because of its revolutions, cause the L-shaped unit to reciprocate within the undercarriage. The crank arm unit will, at the beginning of the rotation of the undercarriage, cause the L-shaped spray unit to move progressively in a forward direction out from the undercarriage. Halfway through its first revolution, the crank arm unit will have extended the L-shaped spray unit from the undercarriage and from that point to completion of the first revolution, will retract the L-shaped spray unit within the undercarriage. The same reciprocal action of the crank arm unit is true on the second revolution of the crank arm unit.

The reciprocal action of the L-shaped spray unit around the ends of the vehicle to be washed will circumscribe a substantially rectangular U-shaped path around the vehicle ends.

A fourth form of the arcuate travel guide means for the L-shaped spray unit is a fluid motor control means adapted to reciprocate the L-shaped spray unit while the undercarriage is being rotated an arcuate distance of 180° at the end of the path of travel of the wash carriage. The fluid motor control means is connected to reciprocate the L-shaped spray unit in a controlled and progressive manner to simultaneously cause the unit when rotated by the undercarriage to subscribe a substantially rectangular U-shaped path around the ends of the vehicle.

The fluid motor control means to reciprocate the L-shaped spray head may take the form of a double acting piston and cylinder arrangement similar to that shown in Italian Pat. 627,777, or a reversible hydraulic motor as shown and described herein.

The motor means to operate the carriage support means together with the spray head mechanism may take various forms. The important consideration in the drive means is the capability of variable speed in order to compensate for rotational speed of the L-shaped spray unit 180° around each end of its path of travel versus its movement along the path of travel. It should be readily understood that the outer end of the L-shaped spray unit will move faster than at the point of its pivotal rotation at the end of the path of travel because of the angular velocity relationship $V = R\theta$ where $\theta$ represents the instantaneous vector angular velocity at radius R.

Thus, it is highly desirable to have the L-shaped spray unit rotate at a slower rate at the ends of the path of travel so that its angular velocity is more compatible with the velocity of the spray unit as it proceeds along the path of travel.

To this end, the motor drive means may be a variable speed motor, or a motor with an SCR control, or a hydraulic motor with variable pressure regulation, or two motors operative at separate different speeds.

In the present invention the drive means is shown to consist of a low speed drive and a high speed drive which comprise two motors operative through a speed reducer, the high speed drive to drive the carriage along its longitudinal path of travel on the track whereas the low speed drive is provided to operate at the ends of the carriage path of travel in order to rotate, at a maintained rate of speed at the same rate as maintained on the spray unit during the straight path of travel run, the L-shaped spray unit 180° around the substantially rectangular path circumscribed at each end of the vehicle to be washed. Control switch means may be provided at the ends of the path of travel of the carriage in order that the carriage may, itself, activate the switch means to disengage the high speed drive and engage the low speed drive to rotate the second carriage and move the L-shaped spray unit around the end of the vehicle to be washed.

The drive means is in operative driving connection with the carriage in order to control its reciprocal movement along the path of travel as well as be effective in operation of the rotation of the L-shaped spray unit through the 180° arcuate distance at the ends of the carriage path of travel. This connective drive means may take the form of a conveyor which may be a cable or a line supported at each end of the path of travel of the carriage by means of pulleys, one of the pulleys being selectively driven by the low speed and high speed motor drives. Obviously, other types of drive means may be utilized if properly incorporated in the vehicle washing apparatus comprising this invention. Examples of other types of drive means for varying speed to drive the L-shaped spray unit around the vehicle ends are planetary gears and clutch arrangements, and a universal motor with variable control or a fluid operated motor controlled by a cam operated servo motor. Examples of other connective drive means are the fluid piston and fluid cylinder motor means. Another form of connective drive means would be the worm drive type which comprises a screw threaded rod having a desired pitch for its entire length. One end of this worm drive rod may be connected to an electrically driven motor which drives the worm drive rod in a single direction and reverses its rotational direction when the carriage is at the ends of its path of travel. The worm drive rod may be provided with a double reverse thread channel so that the cam follower on the carriage may proceed in one direction, and when the carriage is at the other end of its path of travel, the cam follower at the end of the worm drive rod may be transferred over to the second threaded or reverse thread channel and, thus, reverse the direction of the carriage at each end of the path of travel although the worm drive rod be driven in the same rotational direction.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a plan view of an embodiment of the vehicle washing apparatus embodying this invention.

FIG. 2 is a side elevation of the apparatus of FIG. 1.

FIG. 6 is a detail plan view of the carriage means of the embodiment of FIG. 4 as it approaches one end of its path of travel.

FIG. 7 is a sectional view of the embodiment of FIG. 4 along the line 7-7 of FIG. 6.

FIG. 12 is another embodiment of the vehicle washing apparatus of this invention.

FIG. 13 is a cross section of the undercarriage taken along the line 13-13 of FIG. 12.

Figure 3:
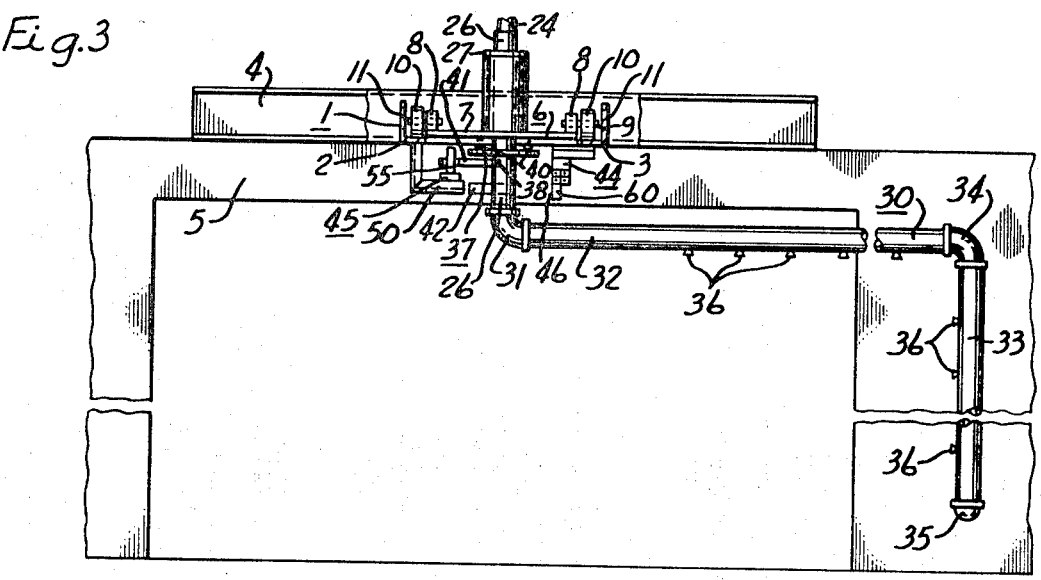
FIG. 3 is an end elevation of the apparatus of FIG. 1.

As shown in FIGS. 1 through 3, the first embodiment of the vehicle washing apparatus of this invention is shown and comprises a suspended elongated track 1 which consists of the two parallel alined rails 2 and 3 secured to the U-shaped frame members 4 at their ends. The U-shaped frame members 4 are suitably secured to the building structure in which the car wash apparatus is housed and in the particular embodiment as shown in the drawings, the U-shaped members 4 are supported on the concrete doorway lintel 5.

The carriage support means 6 supports the washing device in the form of an L-shaped spray unit 30, to be described later, and comprises the frame or base member 7 to which the four wheel bearing blocks 8 are secured to by means of welding or other such suitable means. The wheel members 8 provided in pairs on each side of the carriage support means 6 and support the shafts 9 which each rotatably support a wheel 10 to permit movement of the carriage along the rails 2 and 3. The side flanges 11 of each of the rails 2 and 3 maintain the carriage on the track 1.

Drive means 12 is provided to move the carriage reciprocally along the track 1 and comprises the electric reversible motor 13 which drives the conveyor 14 around the pulleys 15 and 16. Motor 13 may be a variable speed motor. The drive pulley 15 is secured to the drive shaft 18 of the motor 13. A gear reducer 17 is also secured to the drive shaft 18 of the motor 13. The gear reducer 17 provides the desired rate of output drive to the pulley network comprising the pulleys 15 and 16. Pulley 16 is an idler pulley rotatably supported on the shaft 21 which is supported on the supports 20 on the lintel 5.

It should be noted that the conveyor 14 is provided with the spring members 22 at its ends connected to carriage support means 6 in order to maintain a desired tension of the conveyor while the drive means 12 is being operated to reciprocally move the carriage support means 6 along the track 1. The ends of the spring members 22 are secured to the carriage support means 6 at 23.

The spray head mechanism 24 is supported on the carriage support means 6 by means of the collar 25 which is welded to the frame or base 7 of the carriage support means 6. Collar 25 receives the vertical tubular or pipe member 26, and supports the pipe member 26 within the collar 25 by means of the bearing disk 27 welded to the upper portion tubular member 26. The flexible hose member 28 is secured by swivel coupling 29 to the upper end of the pipe member 26 which, in turn, is secured by elbow coupling 31 to the L-shaped spray unit 30. In essence the L-shaped spray unit 30 comprises the principal component of the spray head mechanism 24. The pipe member 26 is rotatable on the collar 25 so that the L-shaped spray unit 30 may be rotated relative to the carriage support means 6. The swivel coupling 29 insures nonentanglement of the hose 28 upon rotation of the L-shaped spray unit 30.

The L-shaped spray unit 30 comprises the horizontal pipe section 32 and the vertical pipe section 33 which are secured together at one of their ends by means of the elbow coupler 34. The other end of the vertical pipe section 33 is capped as shown at 35 whereas the other end of the horizontal pipe section 32 is secured to the elbow coupling 31. The vertical pipe section 33 and the horizontal pipe section 32 are provided with a series of nozzles 36 which are positioned in such a manner to spray directly in a direction normal to the surface of the vehicle to be washed, although some of the spray nozzles, particularly those adjacent to the coupling 34, may be directed at a transverse angle relative to the surfaces of the vehicle in order to avoid interference upon emission of spray between adjacent nozzles 36 on the horizontal pipe section 32 and on the vertical pipe section 33.

As shown clearly in FIGS. 2 and 3, the vertical tubular member 26 of the spray head mechanism 24 may be provided with a ball detent plate 37 which comprises the disk 38 with detents together with the ball members 40. The purpose of the ball detent mechanism is twofold. First, the ball detent mechanism 37 provides a means for stabilizing the rotational movement of the L-shaped spray unit 30 as it progresses around the ends of the vehicle to be washed as well as maintaining the same in a releasably secured position while the carriage support means 6 is traveling along the longitudinal length of the track 1. Secondly, the ball detent mechanism 37 stabilizes the L-shaped spray unit to maintain the same in a position as shown in FIG. 3, that is, to avoid any unwanted and undesirable oscillating movement of the L-shaped spray unit in a vertical plane. It can be easily understood that this oscillating movement is caused by the extenuation of the L-shaped spray unit 30 relative to carriage support means 6 in view of the overhanging length of the horizontal pipe section 32.

An essential feature residing in a vehicle washing apparatus of FIGS. 1 through 3 resides in the arcuate travel guide means and more specifically cam guide means comprising the primary cam arm 41 and the secondary cam arm 42, both of which are secured to the lower end of the vertical tube or pipe member 26. The primary cam arm 41 and secondary cam arm 42 extend outwardly from the tubular member 26 as shown in the FIGS. and the respective cam arms are disposed in a horizontal plane in a direction normal to one another. The primary cam arm 41 is mounted on the pipe member 26 in a vertical plane passing through both the horizontal and vertical pipe sections 32 and 33. The secondary cam arm 42 is in a vertical plane substantially normal to the aforementioned first plane. A right-angled section 43 is provided on the end of the secondary cam arm 42 to engage a stationary arm member 44 secured to the track 1 and positioned adjacent at each end of the track 1 there is provided a catch arm member 45 for the primary cam arm 41.

The stationary arm member 44 is secured to one end of each of the rails 2 and 3 making up the elongated track 1. The stationary arm member 44 comprises the hinge member 46 which is hinged to the stationary member 47 which in turn is secured to one end of the respective rails by means of the L-shaped channel member 48. The catch arm members 45 are rotatably mounted on the L-shaped members 50 which in turn are secured to the other end of the respective rails 2 and 3. The catch arm members 45 are pivotally secured to the channel members 50 at 51 and are provided to pivot from a position shown in solid lines in FIG. 1 to the dotted line position 52 shown in the same FIG. Also a spring (not shown) is provided at the pivot 51 to normally bias the catch arm member 45 in the solid line position as shown in FIG. 1. The arrow 53 in FIG. 1 depicts the arcuate movement of the catch arm member 45.

Thus it can be seen from the foregoing that the primary cam arm 41 together with the secondary cam arm 42 in cooperative relationship, respectively, with the catch arm member 45 and the stationary arm member 44 provides the arcuate travel guide means from which the desired rotational movement of the L-shaped spray unit 30 is provided at each end of the path of travel of the carriage support means 6 on the elongated track 1. This cooperative relationship between the cam arms and the arm members to provide the desired rotational movement of the L-shaped spray unit 30 will now be explained in detail.

As the carriage support means 6 is driven by the drive means 12 along the elongated track 1 from right to left as shown in FIG. 1, the primary cam arm 41, provided with the grasping means 54 at its outer end in the form of a hook, will come in contact with the vertical pin 55 of the catch arm member 45 as depicted in FIG. 3. Continual movement of the carriage support means 6 will cause the catch arm 45 to move along its rotational path as depicted by the arrow 54 but at the same time will cause the L-shaped spray unit 30 to rotate on its bearing disk 27 in a clockwise direction. When the carriage support means 6 reaches the end of its path of travel and makes contact with the control switch means 56, which reverses the driving direction of the motor 13, the L-shaped spray unit 30 will be in a position of parallel alinement with the rails 2 and 3 of the elongated track 1 and positioned substantially under the idler pulley 16. Thus, the L-shaped spray unit 30 has traveled an arcuate distance of approximately 90° during which time the cam arm 41 has been rotated in a clockwise direction due to the fact that its outer end 54 has been in engagement with the pin 55 of the catch arm member 45, which also has been caused to rotate in a clockwise direction as depicted by the arrow 53. On the other hand, the secondary cam arm 42 during this initial 90° arcuate movement of the L-shaped spray unit 30 has passed under the stationary arm member 44 causing the hinging member 46 to move aside as depicted in FIG. 2 by the arrow 57 to take the dotted line position as shown at 58. After the L-shaped spray unit 30 has completed its 90° arcuate movement, due to the fact that the carriage support means 6 has reached the end of its path of travel and in contact with the control switch means 56, the secondary cam arm 42 will have completely passed under the hinge member 46 of the stationary arm member 44 so that the former will return to its original position as shown in solid line in FIG. 2. In order to insure that the hinge member 46 returns in a positive manner to its proper position, a bias spring (not shown) may be placed at the point of hinging.

It should be noted that the right-angled section 43 of the secondary cam arm 42, when the L-shaped spray unit 30 is positioned substantially under the idler pulley 16 will be in opposed relationship to the hinge member 46 of the stationary arm member 44. Thus, as the control switch means 56 causes reversal of the motor 13, so does the carriage support means 6 reverse its direction of travel and proceed from left to right in FIG. 1 along the track 1. At the same time, primary cam arm 41 will slip from engagement of the pin 55 of the catch arm member 45 permitting the latter to return to its normally biased position as shown in solid line in FIG. 1. In the meantime, as the carriage support means 6 continues on its movement in its path of travel along the elongated track 1 from left to right of FIG. 1, the right-angled section 43 of the secondary cam arm 42 will come into abutting relationship with the back surface 60 of the hinge member 46 of the stationary arm 44. It will be noted that the hinge member 46 cannot rotate in a direction opposite to that shown in FIG. 2 with respect to the path of movement indicated by arrow 57. As a result the right-angled section 43 causes further rotation of the L-shaped spray unit 30 through an arcuate distance of substantially 90°. Thus it can be seen that the L-shaped spray unit 30 is rotated through a total course of 180° at either end of the path of travel on the elongated track 1 in view of the cooperative relationship of the cam arms and the arm members as described above.

Figure 5:
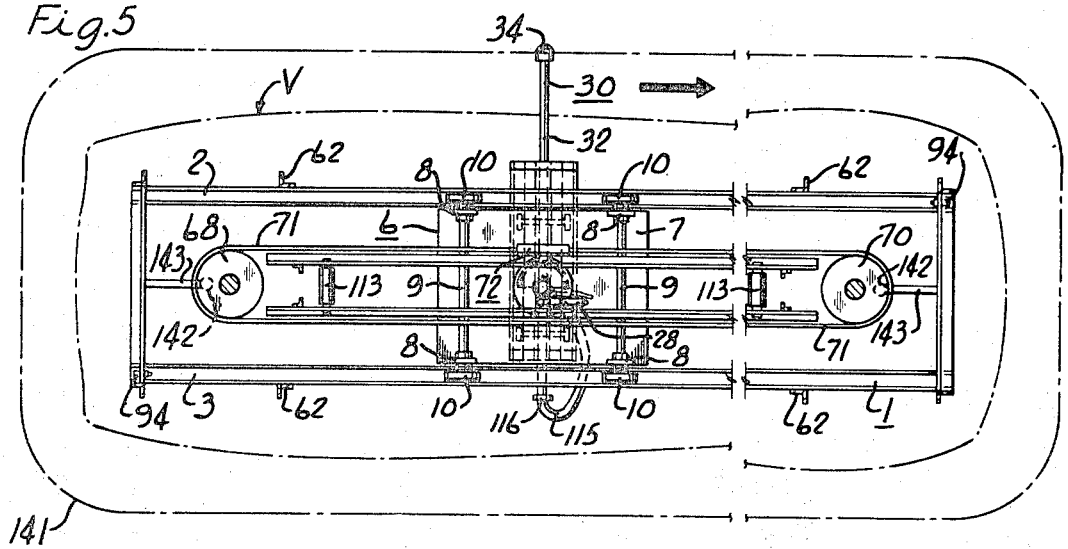
FIG. 5 is a plan view of another embodiment of this invention depicting the path of movement of the L-shaped spray unit.

It is of interest to note that in order to obtain the desired path of movement around the ends of the vehicle to be washed, that is, a path of movement substantially rectangular U-shaped path in contour as depicted in FIG. 5 at 141, the arcuate movement of the unit 30 must be first quite rapid as the carriage 6 approaches each end of its path of travel and then becomes progressively slower in its arcuate movement as the unit is rotated under the area of the pulleys 15 or 16 and track 1. Unit 30 upon transgressing a substantial portion of its arcuate path, must again move quite rapidly to the path of movement in preparation of movement of the carriage 6 along the track 1. The utilization of the swivel catch arm 45 and the right-angle section 43 on the secondary cam arm 42 provide the necessary rapidity of arcuate movement of the unit 30 at the beginning and at the end of arcuate path of travel.

As shown in FIG. 1, a double pole switch 19 may be positioned at one end in each of the track rails 2 and 3 to provide switching means for motor 13 to be operated at a lower rate of speed to permit the proper functioning of the spray unit 30 upon approaching and digressing from each end of its path of travel. The speed of travel of the carriage 6 along the track 1 may be excessive when the spray unit 30 is moving through an arcuate distance of 180° in circumscribing path around each end of the track in view of the relationship $V = R\theta$, discussed hereinafter.

The movement of the L-shaped spray unit 30 and repositioning of the unit in the proper alined relationship normal to the track 1 for its travel between the ends of its path of travel thereon is properly brought about by the ball detent mechanism 37. Upon initial contact of the primary cam arm 41 with the catch arm member 45, the ball detent mechanism 37 is caused to be released from its secured position to permit rotation of the spray unit 30. By the same token, when the carriage support means 6 is digressing from either end of its path of travel along the elongated track 1, secondary cam arm 42 will cause rotation of the spray unit 30 an arcuate distance of substantially 90° at the end of which the ball detent mechanism 37 will again be placed in engaged position to maintain the spray unit 30 in a stable as well as in a position normal to the longitudinal length of the elongated track 1 while the carriage support means 6 is progressing along the path of travel.

Figure 4:
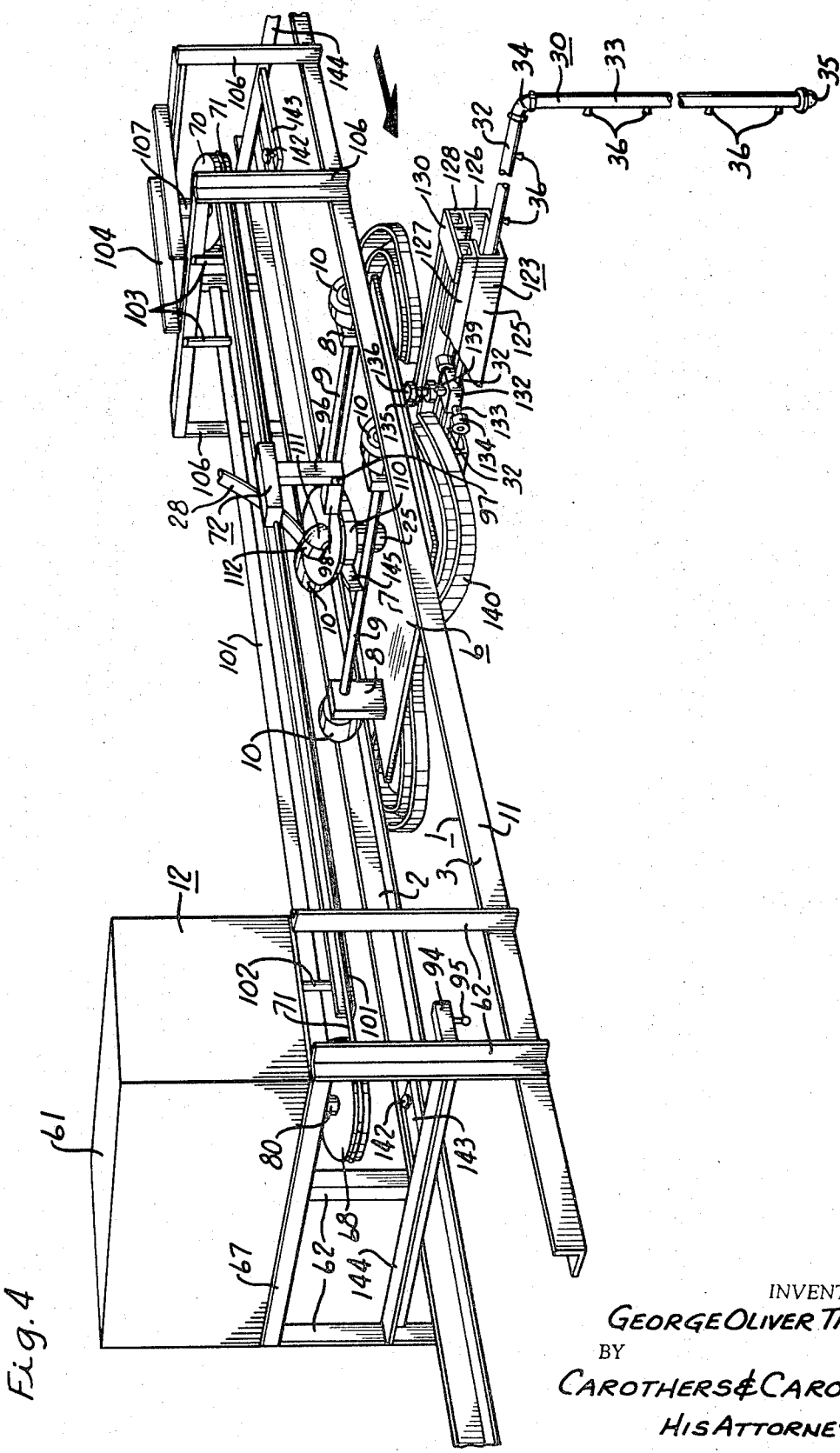
FIG. 4 is a perspective view of another embodiment of the vehicle washing apparatus comprising this invention.

A second embodiment of the vehicle washing apparatus of this invention is shown generally in FIG. 4. As in the case of the first embodiment shown in FIG. 1, the second embodiment shown in FIG. 4 comprises the carriage support means 6 which is supported on the elongated track 1 comprising rails 2 and 3 with side flanges 11. The wheels 10 are supported on the axles 9 and support the carriage support means frame 7 by means of the bearing blocks 8 secured to the frame 7. The drive means 12 is housed within the housing cover 61 which is supported above one end of the elongated track 1. The housing cover 61 is provided to protect the drive means 12 from the water spray and detergents which develop a mist atmosphere present in connection with the operation of the vehicle washing apparatus. The drive means 12 is supported on the legs or standards 62 extending from the rails 2 and 3 of elongated track 1. Although not shown in FIG. 4, the ends of rails 2 and 3 may properly be supported in a building structure at a sufficient height from the ground to permit the passage of a vehicle below the carriage support means 6 together with the spray head mechanism.

Figure 9:
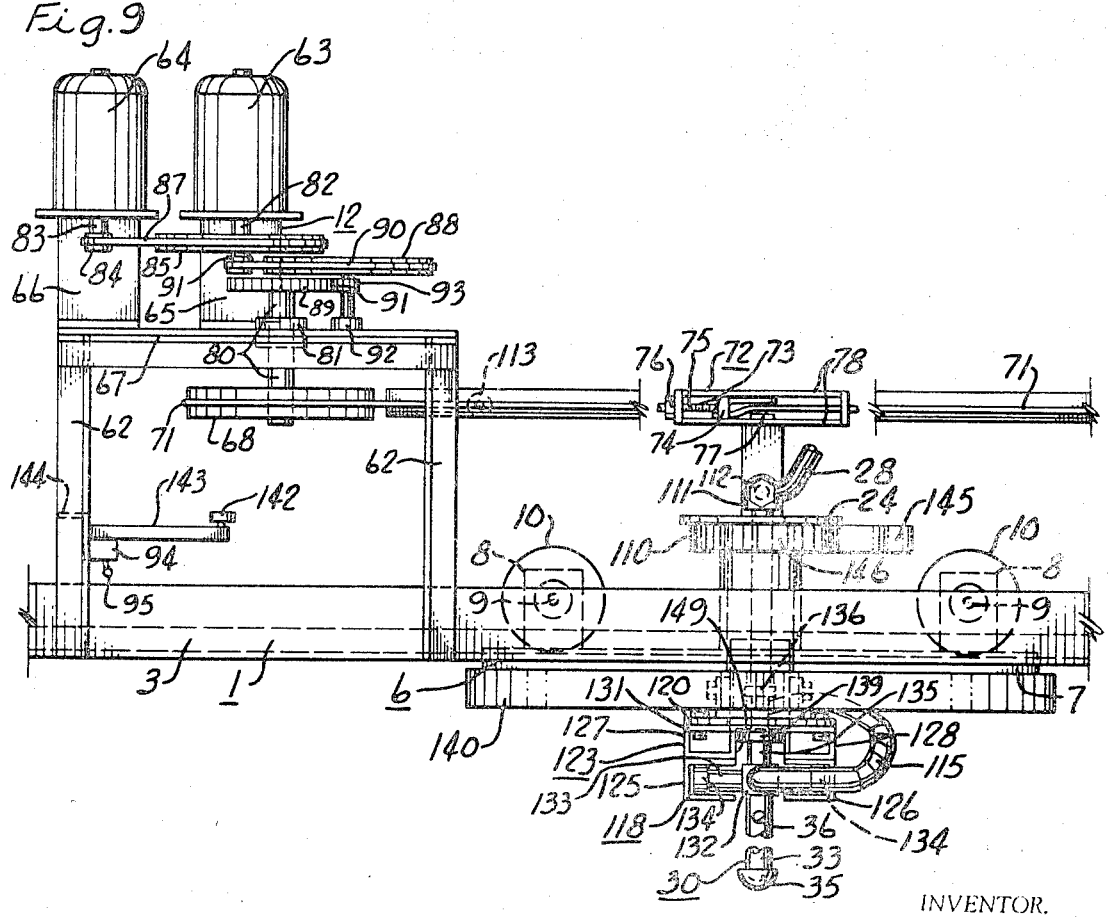
FIG. 9 is a side elevation of the embodiment of FIG. 4 showing the carriage means approaching the end of its path of travel.

As shown in FIG. 9, the housing cover 61 is removed to show the details of construction of the drive means 12 which in this embodiment comprises the high speed drive motor 63 and the low speed drive motor 64 supported respectively on the standards 65 and 66 on the base frame 67 which in turn is supported by the standards 62. As can be seen from FIG. 5, pulley means are provided at each end of the path of travel of the carriage support means 6 in the form of pulleys 68 and 70 for driving the conveyor 71. The conveyor 71 may be in the form of a cable the ends of which are secured into the conveyor locking device 72. The ends 73 of the conveyor 71 are held within the clamp 74 and tension is placed on the ends 73 of the conveyor 71 by means of the threaded bolt 75 secured to the clamp 74. Upon tightening of the nut 76 on the threaded bolt 75 the ends of the conveyor are pulled around opposite the sides of the guide bar 77 secured between the side plates 78 of the device 72 and as a result the conveyor 71 may, in this manner, be drawn taut around the pulleys 68 and 70.

It will be noted that pulley 68 is secured to the vertically disposed shaft 80 which is journaled in the bearing member 81 in the frame section 67. The shaft 80 of pulley 68 is connected directly to the drive means 12.

The drive means 12 comprises a series of belt and gear reductions in such a manner that the low speed drive motor 64 uses the output shaft 82 of the high speed drive motor 63 as a jack shaft and represents a belt reduction which is the first of a series of speed ratio reductions. Two belt reductions are provided as shown in FIG. 9 together with one gear reduction. The reduction ratio is determined by application of the aforementioned formula, $V = R\theta$, wherein R is determined by the diameter of the pulley 68 or 70 and the length of arm section 32 of the spray unit 30. The output shaft 83 of the low speed drive is provided with belt pulley 84 which drives belt pulley 85 on the output shaft 82 of the high speed drive 63 through the belt 87. A unidirectional clutch (not shown) is provided to rotatably support the belt pulley 85 so that belt pulley 85 drives jack shaft 82 only when the low speed drive motor 64 is in operation. When the high speed drive motor 63 is in operation, the unidirectional clutch will disengage so that drive motor 63 will not drive the low speed drive motor 64. The belt pulley 85 will idle as the high speed drive motor 63 drives the output shaft 82 to drive the belt pulley 88 by means of the belt 90 from the belt pulley 91 on the end of the jack or output shaft 82.

Belt pulley 88 is secured to shaft 91 which is journaled at its lower end in the bearing mount 92 in the frame 67. Shaft 91 is also provided with the nonrotatable gear 93 which is in engagement with the large gear 89 on the output shaft 80. Thus, operation of the shaft 82 either as a jack shaft for the low speed drive motor 64 or as an output shaft for the high speed drive motor 63 drives the belt pulley 88 through the belt 90 which in turn drives the shaft 91 and, thus, gear 93 to drive gear 89 secured on the output shaft 80.

As shown in FIGS. 4 and 9, control switch means 94 which is in the form of a limit switch secured to one of the four standards 62 or 106. The limit switch 94 is actuated by the wheel 10 of the carriage support means 6 and the limit switch arm 95 of the limit switch 94 is extended sufficiently to permit the forces of inertia imposed upon the carriage 6 to take a limited time and distance on the elongated track 1 to come to a complete stop. The length of the limit switch arm 95 is selected to cover the distance the carriage 6 travels due to inertia. Otherwise, the switch 94 may also be moved to help compensate for inertia travel.

As the carriage 6 approaches the end of the track 1, the carriage 6 will come to a stop in a position wherein the spray head mechanism 24, positioned in the central portion of the carriage, will be centrally located and substantially axially alined relative to the axial center of drive pulley 68. At the same time the forward wheel 10 of the carriage 6 will engage with limit switch arm 95 whereby operation of the high speed drive motor 63 is extinguished and the low speed drive motor 64 is brought into operation.

It should be carefully noted that the conveyor 71 actually pulls the carriage along the track 1 since the conveyor 71 is connected to the spray head mechanism 24 by means of the conveyor locking device 72 which in turn is connected by means of the pivotal arm member 96 to the spray head mechanism 24 as shown clearly in FIG. 7. The arm 96 is pivotally connected at 97 to the horizontal member 98 which in turn is secured to the bearing disk 27 of the spray head mechanism 24. The arm 96 carrying the clamping device 72 is made pivotal in order that conveyor 71 in its taut condition may impose the guide bearing pads 100 of the conveyor locking device 72 to be maintained in continuous contact relationship with the edges 108 of the guide rails 101. The guide rails 101 are supported from the frame network at each end of the vehicle washing apparatus above the elongated track 1. As shown in FIG. 4, the guide rails 101 are supported by the braces 102 from the frame 67. The guide rails 101 are supported at the other end of the vehicle washing apparatus by means of the braces 103 supported from the frame 104. The frame 104 is supported by the standards 106 from the track 1 and supports the pending shaft 107 which rotatably supports at its lower end the idler pulley 70.

Although not shown for the purpose of clarity, it should be noted that the drive pulley 68 and the idler pulley 70 may be provided at its peripheral edges with circumferential lips in order to insure that the conveyor 71 during operation remains on the peripheral edge of each of these pulleys.

Again referring to the guide bearing pads 100, as it can be seen best in FIG. 6, the bearing pads remain in contact with the horizontal flange edge 108 of each of the guide rails 101 and is effective to stabilize the spray head mechanism 24 from undesirably oscillating during its movement along its path of travel on the track 1.

Thus, the conveyor 71 pulls the carriage 6 along the track 1 through its connection with the conveyor locking device 72. As the locking device 72 approaches and proceeds around peripheral edge of either pulley 68 or 70, the spray head mechanism 24 as shown in cross section in FIG. 7 is also caused to be rotated a total arcuate distance of 180°. The L-shaped spray unit 30 is also caused to be rotated an arcuate distance of 180° since the unit is part of the spray head mechanism 24. After the locking device 72 has transgressed this arcuate distance, the conveyor 71 proceeds to pull the carriage 6 from under either of said pulleys 68 or 70 and also, at the same time, releases the limit switch 94 which extinguishes the operation of the low speed drive motor 64 and permits the return of the operation of the high speed drive motor 63.

The details in the operation of the L-shaped spray unit 30, being part of the spray head mechanism 24, will now be explained in detail.

As previously indicated the spray head mechanism 24 comprises the bearing disk or plate 27 which is also provided at its peripheral edge a downward depending semicircular flange referred to as the stabilizing guide lip 110, the purpose of which will be explained hereinafter. The bearing disk 27 has a central opening to receive, such as through welding the upper end of the vertical tubular pipe 26 to which, through the swivel coupling 111 and swivel connecter 112, is connected the flexible hose 28. The flexible hose 28 is for the purpose of supplying the water and washing detergents to the spray unit 30. As shown in FIG. 5, there are a pair of rollers rotatably secured to rotate between the guide rails 101 adjacent the ends of the guide rails. The purpose of the rollers 113 is to protect the flexible hose 28 when the carriage 6 is positioned under either of the pulleys 68 and 70 preventing the flexible hose 28 from becoming entangled or subjected to abrasive action from the structures supporting the pulleys 68 and 70.

Referring again to FIG. 7, it will be noted that the other end of the vertical tubular member 26 is connected through coupling 114 to the flexible hose 115, whence through coupling 116 is connected to the horizontal pipe section 32 of the spray unit 30.

The sleeve block 117 is welded to the dower portion of the vertical pipe member 26. A second carriage means in the form of the secondary or under carriage 118 is secured to the sleeve block 117 by means of the annular flange sleeve 120 which, as it will be noted, is L-shaped in cross section. One flange of the annular flange sleeve 120 is connected by the bolt 121 to the sleeve block 117 whereas the other flange of the annular flange sleeve 120 is connected by bolts 122 to the plate 131 of the under carriage frame 123. An opening 124 is provided in a portion of the annular flange sleeve 120 to permit the entrance and coupling of the flexible hose 115 to the coupling 114.

Upon examination of FIG. 7 it will be readily ascertainable that the entire spray head mechanism 24 as described is free to rotate on the vertical collar 25 which is secured to the base or frame 7 of the carriage 6. As clearly shown also in the same FIG., an opening is provided in the base 7 to permit the entrance of the vertical pipe section 26 as well as the sleeve block 117.

As indicated in FIGS. 4 through 9, the parts comprising the L-shaped spray unit 30 are basically the same as those found in the construction of the L-shaped spray unit 30 in FIGS. 1 through 3.

FIGS. 4 and 9 express in the best detail the structure comprising the undercarriage 118. The undercarriage frame 123 comprises essentially two U-shaped channels 125 and 126 in opposed relation which provide a trackway for movement of the spray unit 30. On the top of each of the channels 125 and 126 are secured, respectively, the U-shaped channel members 127 and 128. The flanges of the U-shaped channel members 127 and 128, as shown in FIG. 4, are extended upwardly. Plates 130 are secured, as by welding, to each end of the frame 123 across the edges of the flanges of the channel members 127 and 128 so that the channel members are held in a secure relationship as shown in the FIGS. Plate 131 also provides the same function as plates 130 and this is the plate to which is secured the annular flange sleeve 120 as shown in FIG. 7.

Figure 8:
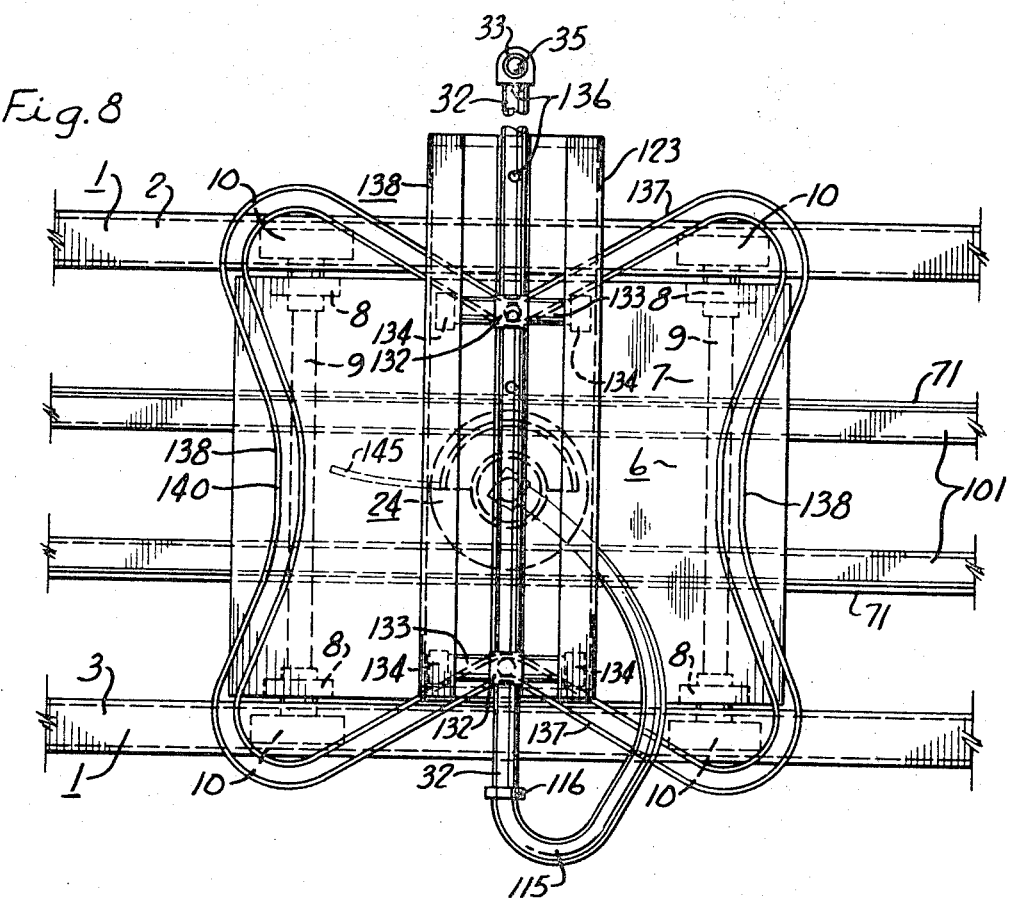
FIG. 8 is a bottom view of the carriage means of the embodiment of FIG. 6.

As shown in FIGS. 4, 8 and 9, the horizontal pipe section 32 of the spray unit 30 has secured in sections thereof the joint blocks 132 to each of which is secured an axle support 133 to support a pair of rollers 134. Of course the joint blocks permit the passage of fluid from the flexible hose 115 through the entire length of the horizontal pipe section 32 to be dispensed from the nozzles 36.

Each of the joint blocks 132 has secured to its top, the upwardly extended vertical support 135. Each of the axle supports 135 support a roller 139 to guide the spray unit 30 in its reciprocal movement along the trackway channels 125 and 126. The guide rollers 139 are positioned to engage the upward extending flanges 149 of the trackway channels 127 and 128.

It will be noted that outer or forward most joint block 132 is provided with a longer vertically disposed axle support 135, the upper end of which supports the guide 136 which may be in the form of a bearing roller. Thus, this extended joint block axle 135 supports to adjacently disposed guides 136 and 139. The guide 136 travels within the looping trackway 140 which is secured to the bottom of the frame 7 of the carriage 6. The trackway 140 is specifically designed to take the contour of that shown in FIG. 8 which represents something like two FIG. 3's, the ends of which are connected together. However, it is preferred to refer to the closed loop trackway as substantially quadepicycloidal and, as such, represents something similar in overall appearance to a four-leaf clover except that the four points or areas of inward curvature of the trackway 140 are not inwardly curved to such an extent as in the case of a four-leaf clover. Further, the inwardly curved portions 137 curve into a greater extent than the inwardly curved portions 138 of the trackway 140.

It should be readily realized that rather than securing the trackway 140 underneath the carriage 6, the trackway could be divided equally to provide two sections of trackways similar to unjoined FIG. 3's positioned in opposed relation at opposite ends of the track. A FIG. 3 trackway section would be secured to an underside of the track 1 beneath a pulley 68 or 70 so that the carriage 6 upon arriving at the end of its path of travel is positioned so that guide 136 is led through the FIG. 3 trackway causing the spray unit 30 to follow a rectangular U-shaped path.

As shown in FIG. 8, the plane of the spray unit 30 is in a plane substantially normal to that of the elongated track 1 which is the normal position for the L-shaped spray unit 30 as the carriage 6 travels the length of the track 1. From this point alone it should be obvious that the inwardly curved portions 137 of the trackway 140 are more inwardly curved than those of the portions 138 for the simple reason that the vertical pipe section 33 of the L-shaped spray unit 30 must be positioned as close as practical to the side surfaces of the vehicle, V, to be washed. However when the carriage 6 reaches either end of its path of travel and the spray head mechanism 24 is positioned axially under either of the pulleys 68 and 70, the conveyor 71 will cause the conveyor locking device 72 to travel around the periphery of the pulley which in turn will cause rotation of the spray head mechanism 24 and hence reciprocal movement of the L-shaped spray unit 30 on its rollers 134 in the frame 123 of the undercarriage 118. This motion of movement through an arcuate distance around each end of the elongated track 1 circumscribed by the L-shaped spray unit 30 is accompanied with reciprocal movement within the undercarriage 118 in view of the fact that the roller guide 136 is caused to follow the path within the trackway 140. Because of the particular bow shape of the trackway 140 including the inwardly curved portions 138, the vertical pipe section 33 is caused to subscribe a substantially rectangular U-shaped path around the ends of the vehicle, V. This path of movement of the spray unit 30 with point of reference to the vertical pipe section 33 is depicted by the dotted line 141 in FIG. 5. The dotted line V represents the outline of the vehicle that is being washed by the vehicle washing apparatus. As can be seen from FIG. 5, the path taken by the spray unit 30 is substantially rectangular in its entire cycle and for all practical intents and purposes maintains a substantially uniform distance from all surfaces, both side and ends, of the vehicle V.

Thus it can be seen from the construction of the embodiment in FIG. 4, that the arcuate travel guide means comprises the undercarriage 118 together with the operation of the spray unit 30 within the undercarriage frame 123 brought about by the particular design features incorporated into the closed loop trackway 140 which guides the spray unit 30 in its designated path of travel around the ends of the vehicle. Thus, the desired objectives set forth previously herein in the Summary of Invention are obtained by the vehicle washing apparatus of this embodiment.

As best shown in FIGS. 4, 6 and 9, the stabilizing guide lip 110 receives the roller guide 142 supported above the elongated track 1 by means of the bar 143 supported above the elongated track 1 by means of the bar 143 which is supported by the connecting frame members 144. A connecting frame member 144 is on a pair of standards 62 and 100 as shown in FIG. 4.

The carriage 6 on approaching either end of the track 1 at the point of being properly positioned underneath either of the pulleys 68 or 70, the stabilizing tongue 145 of the stabilizing guide lip 110 guides the roller guide 142 into the semicircular stabilizing guide lip 110. Upon rotation of the spray head mechanism 24 by means of the conveyor 71 pulling and guiding the conveyor locking device 72 around the peripheral edge of the pulley, the roller guide 142 is caused to roll along the inner surface 146 of the stabilizing guide lip 110. The purpose of this stabilizing structure means, in the form of the roller guide 142 in cooperative relationship with the intercepting tongue 145 and the stabilizing guide lip 110, is to stop possible drifting of the carriage 6 in its positive location under either of the pulleys 68 or 70 at the end of the path of travel of the carriage support means. This stabilizing structure means holds the carriage support means 6 in a firm position as the spray unit 30 is caused to reciprocate within the undercarriage 118 as the guide 136 follows it path along the trackway 140 being driven by the conveyor 71 pulling the conveyor locking device 72 around the peripheral edge of the pulley.

The conveyor locking device 73 maintains the conveyor 71 in taut condition around the pulleys 68 and 70 and may be periodically adjusted, if need be, to tighten up the conveyor. The conveyor 71 being in taut condition, the conveyor will not normally slip on the pulleys 68 or 70, when pulley 68 is being driven by the drive means 12. However, to insure nonslippage of the conveyor, the peripheral surfaces of the pulleys may be roughened or provided with an applied roughened surface to grip the conveyor as it continually proceeds around these pulley surfaces. Also outwardly extended prongs may be provided at intervals on the peripheral edges of the drive pulley 68 to engage the conveyor locking device 72 as it passes around the pulley to insure positive drive relationship between drive pulley 68 and the conveyor 71 when the spray unit 30 is traversing around the ends of the vehicle V. The conveyor 71 may be provided at its half length with a prong engaging device (not shown) secured firmly to the conveyor to be engaged by the pulley prongs on pulley 86 when, the carriage 6 is positioned beneath the idler pulley 70 to perform the same function in the same manner as the conveyor locking device 72.

Although the operation of the washing vehicle apparatus as shown in FIGS. 4 through 9 has already been referred to above, a more specific description of the operation is as follows. After a vehicle V has been positioned under the vehicle washing apparatus as shown in FIG. 5, the vehicle washing apparatus, in the position as shown, is started into operation by paratus, in the position as shown, is started into operation by switch means usually provided in the form of a floor switch plate upon which one of the wheels of the vehicle V has been driven. The washing cycle is thus commenced and the carriage 6 is driven from left to right of the FIG. along the track 1 by means of the conveyor 71 from the drive pulley 68 through the drive means 12 by the high speed drive motor 63. When the carriage 6 has been positioned under the idler pulley 70 by the conveyor 71, the conveyor locking device 72 will cause rotational operation of the spray head mechanism 24 which in turn causes the guide 136 to follow one-half the track length of the closed loop trackway 140. Because of the particular design of the trackway 140, the spray unit 30 is caused to take a substantially U-shaped rectangular path as indicated at 141. It should be noted that when the carriage 6 is positioned underneath the idler pulley 70, the forward wheel 10 comes in contact with the limit switch 94 which causes operation of the low speed drive motor 64 and simultaneously the extinguishment of the operation of the high speed drive motor 63. The ratio difference between the low speed drive and the high speed drive is such that the movement of the spray unit 30 around the ends of the vehicle V is at the same rate of speed as in the case where spray unit 30 is being moved along the longitudinal length of the track 1. It is readily understood that in order to obtain a constant speed rate of the spray unit 30 throughout its entire path of travel 141, the formula $V = R\theta$ must be taken into consideration when the spray unit 30 is progressing around the ends of the vehicle V. In this formula $\theta$ is the only variable since the arm length of extension length of the spray unit 30, namely, the length of the horizontal pipe section 32, is constant so as is the diameter of the pulleys 68 and 70. In this formula $\theta$ equals the arcuate velocity and in the formula, with R constant, $\theta$ is picked to be such a rate of speed as to be equal to the velocity V which is also the velocity of the carriage 6 as it travels along its path of travel on the track 1.

When the carriage 6 has traversed one end of the vehicle V, the spray unit 30 continues to travel from right to left in FIG. 5 along the path 141 until the other end of the path of travel is reached, at which time the carriage 6 is properly positioned under the drive pulley 68 and the spray unit 30 is again caused to circumscribe a substantially rectangular U-shaped path around this other end of the vehicle V in the same manner as just described above in connection with first mentioned end of the vehicle V.

After the spray unit 30 has completely circumscribed the second mentioned end of the vehicle V, the carriage 6 then proceeds from left to right again (FIG. 5) along track 1 to be finally stopped in the position from whence it started. As the carriage support means leaves the vicinity from underneath the drive pulley 68, the control switch arm 95 of the limit switch 94 is released from the wheel 10 of the carriage support means to permit the high speed drive motor 63 to commence operation while extinguishing the operation of the low speed drive motor 64.

The above mentioned completed cycle can be repeated for the rinse cycle so that two complete cycles over the path 141 is completed by the spray unit 30, the first cycle to wash the sides and ends of the vehicle V with a detergent and thence a second cycle to rinse the sides and ends of the vehicle of the detergent and dirt and other foreign matter cleansed from the vehicle surfaces. On the other hand, and more preferred multicycles such as two wash cycles followed by two rinse cycles can be programed Since the vehicle washing apparatus comprising this invention is operated in a highly moistened atmosphere, it is desirable that the parts and components of the apparatus to be constructed of metals, such as, of aluminum and stainless steel.

Figure 10:
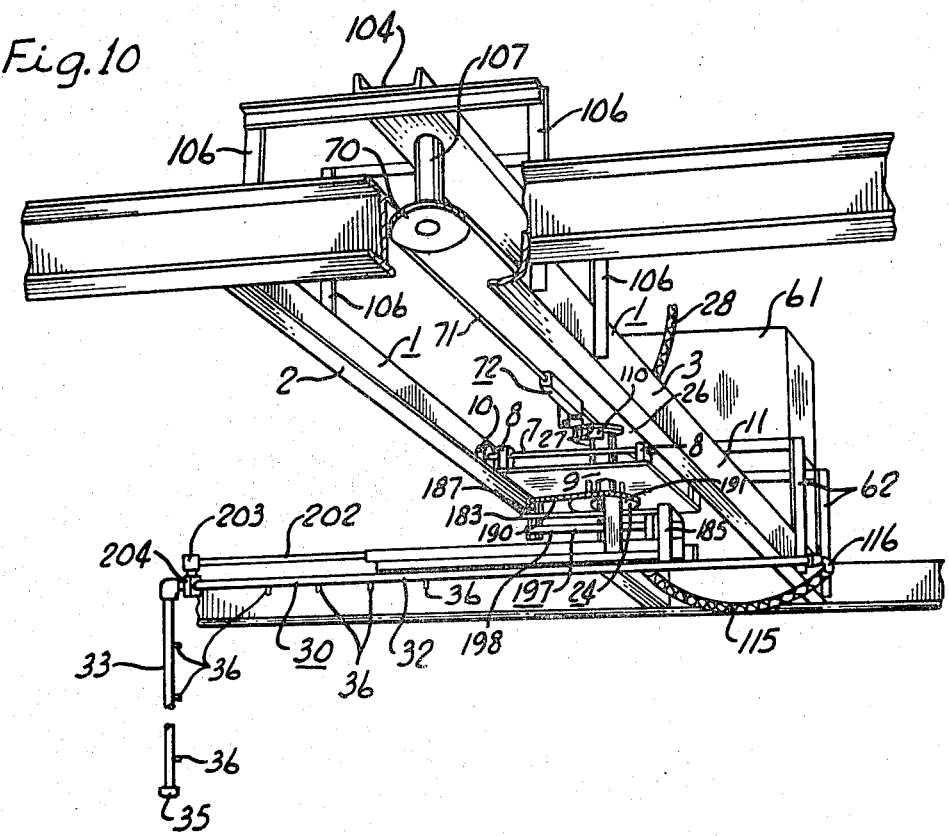
FIG. 10 is a perspective view of the preferred embodiment of the vehicle washing apparatus of this invention.
Figure 11:
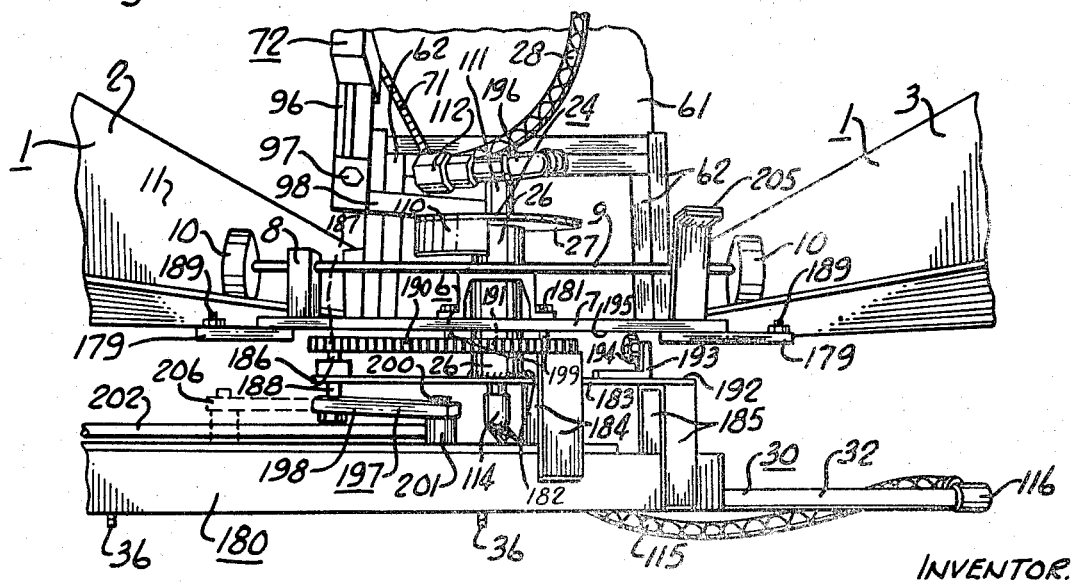
FIG. 11 is a side elevation of the preferred embodiment of FIG. 10.

Reference is now made to FIGS. 10 and 11 wherein there is shown a third and preferred embodiment of this invention.

As in previous embodiments, there is provided the track 1 consisting of the rails 2 and 3 upon which is rotatably supported the carriage support means 6 in the form of the frame 7 with the wheels 10 supported on the axles 9 in the bearing blocks 8 secured to the frame 7.

As in the case of the embodiment shown in FIG. 4, the housing cover 61 encloses the drive means 12 which comprises the high speed drive motor 63 and the low speed drive motor 64 as previously described in connection with that FIG. The legs or standards 62 support the drive means 12 in the housing cover 61 from the rails 2 and 3.

As in the case in the embodiment shown in FIGS. 4 through 9, the drive means 12 is provided with horizontally disposed pulley 68 which in turn drives the horizontally disposed pulley 70 as shown in FIG. 10 supported from the frame 104 from the pending shaft 107 and thus rotatably supporting at its lower end the idler pulley 70. The frame 104 is supported by the standards 106 from the rail members 2 and 3.

The conveyor 71 in the embodiment shown in FIGS. 10 and 11 is of the chain type and each of the respective pulleys 68 and 71 are provided with a corresponding configuration in the outer perimeter thereof to receive in direct drive engagement the chain linkage of the conveyor 71.

Although not shown, the guide rails 101 supported substantially adjacent to the conveyor 71 between the pulleys 68 and 70 may be provided although it is not shown in the embodiment of FIGS. 10 and 11.

With general reference to FIG. 10 and more specifically to FIG. 11, it can be seen that the second carriage or undercarriage 180 is rotatably supported on the bearing mount 181 on the frame 7 by means of the vertical tubular or pipe member 26. The undercarriage 180 is substantially identical in construction to the undercarriage 123 of FIG. 4 and includes the L-shaped spray unit 30 with horizontal section 32 and vertical section 33, the lower end of which is capped at 35. The spray nozzles 36 are provided along the length of each of the vertical members 33 and the horizontal members 32.

As can be seen in FIG. 11, the undercarriage 180 is secured at 182 to the vertical pipe member 26 by means of the bracket arm 183. The bracket arm 183 is attached or secured to the undercarriage 180 by means of the pairs of securing standards 184 and 185. The forward end 186 of the bracket arm 183 rotatably supports the small gear member 187 by means of the shaft 188. The gear 187 is interconnected by means of the chain drive 190 to the large diameter gear 191 which is fixed to the plate or base member 7 by means of the bolt members 199. The rearward end 192 of the bracket arm 183 is provided with mounting bracket 193 which rotatably supports the roller 194 which rides along the bottom surface 195 of the frame 7. As will be more evident hereinafter, the roller 194 insures smooth rotation of the undercarriage 180 and at the same time acts as a bracing in supporting the forward end of the undercarriage 180 in a horizontal plane as well as the reciprocal L-shaped spray unit 30 housed therein.

As shown in FIG. 11, the spray head mechanism 24 is of the same construction as the previous embodiment and includes the bearing disk 27 welded to the upper portion of the tubular or pipe member 26 and provided with the stabilizing guide lip 110. The conveyor locking device 72 which connects the ends of the chain link type conveyor 71 together includes the pivotal support arm member 96, pivoted at 97 to the horizontal member 98 which in turn is secured to the spray head mechanism 24.

The water and detergent to be supplied to the L-shaped spray unit 30 is provided through flexible hose 28 which is connected by swivel connecter 112 to swivel coupling 111 (hidden in FIG. 11) by means of pipe and coupling member 196 to the vertical pipe member 26. Pipe member 26 is connected to coupling 114 of flexible hose 115, the other end of which is provided with the coupling 116 secured to the ends of the horizontal pipe member 32 of the L-shaped spray unit 30.

As shown, extension arms 179 may be provided to extend underneath the rails 1 and 2 and wheels 10, the outer ends of which are provided with antifriction carriage stabilizers 189 to firmly hold and stabilize the carriage 6 on the track 1.

Reference is now made to the arcuate travel guide means wherein there is provided the rotatable crank arm unit 197 comprising the crank arm 198 having one end fixed to the vertical shaft 188 rotatably supporting the small diameter gear 187 and its other end rotatably mounted on the pin shaft 200 housed in the bearing clock 201 secured to the rearward end of the extension bar 202. The extension bar 202 has its forward or outer end 203 connected to the horizontal pipe member 32 of the L-shaped spray unit 30 by means of the bracket 204 as shown in FIG. 10.

The gear ratio of the small gear 187 to that of the larger gear 191 is 4 to 1. As the carriage support means 6 reaches each end of its path of travel under the respective pulley members 68 and 70, the limit switch actuator 205, as shown in FIG. 11, actuates the limit switch 94 bringing into operation the low speed drive motor 64 while at the same time the spray head mechanism 24 is caused to rotate by means of conveyor locking device 72 around the perimetral extent of the respective pulley. Rotation of the spray head mechanism 24 will also cause rotation of the small diameter gear 187. Since the smaller gear 187 is rotatably supported on the bracket arm 183 and the larger gear 191 is fixed to base member 7, the chain drive 190 causes the small gear 187 to be rotated.

As can be seen clearly in FIG. 11, this rotation of the smaller gear 187 will in turn rotate the crank arm 198, the resultant action of which will extend the L-shaped spray 30 out of the undercarriage 180. The crank arm 198 as shown in FIG. 11 is in its normal position since the carriage support means 6 is shown proceeding along its path of travel along track 1. The gear ratio above mentioned being 4 to 1, the smaller gear 187 will be caused to make two complete revolutions for every one-half revolution of the spray head mechanism 24.

Due to the motion of the crank arm 198, the L-shaped spray unit is caused to be moved slowly outward at the beginning of the rotation of the spray head mechanism 24 until it obtains the dotted outline position 206 as shown in FIG. 11. Upon reaching this position 206, the crank arm 198 through continuous rotation of the small gear 187 will be caused to withdraw the L-shaped spray unit 30 within the undercarriage 180 back to its normal position as shown in this FIG. At this time, the L-shaped spray unit 30 is positioned in a plane parallel to the longitudinal length of the track 1, the smaller gear 187 having moved through one complete cycle. Completion of the next complete cycle of the smaller gear 187 will cause again the crank arm 198 to make one complete revolution through the dotted line position shown at 206 in the manner just described. Upon completion of this motion of the crank arm 198, the carriage support means 6 is in a position to be moved along its path of travel to the other end of the track 1 with the L-shaped spray unit 30 positioned substantially in a plane 90° relative to the track 1. The motion of the crank arm 98 through two consecutive rotations thereof at each end of the path of travel causes reciprocal motion of the L-shaped spray unit 30 within the undercarriage means 180 which causes the spray unit, when so rotated 180° around the vehicle to be washed, to subscribe a substantial rectangular U-shaped path around the vehicle ends as previously depicted in FIG. 5. It can be seen that this embodiment is preferred over previous embodiments because of its simplicity in construction in providing the substantially U-shaped path of travel around the ends of the vehicle V to be washed and rinsed.

Reference is now made to the last embodiment as shown in FIGS. 12 and 13 wherein there is provided the track 1 comprising the rails 2 and 3 to support the carriage support means 6 with a base frame 7 supporting the bearing blocks 8 for the wheels 10 by means of the shaft 9. The vertical pipe member 26 mounted within the spray head mechanism 24 which in this embodiment comprises the large diameter cylindrical member 207 to which is secured the conveyor locking device 72 in the manner previously explained. For the sake of simplicity, the bearing disk 27 and the stabilizing guide lip 110 are not shown, particularly since they are not of crucial necessity with respect to the functional operation of the vehicle washing apparatus comprising this invention.

The cylindrical member 207 as well as the vertical pipe member 26 are rotatable mounted on the bearing 208 and bearing support 209 which is secured by means of bolts 210 to the base frame 7. The undercarriage 211 is supported from the end of the vertical pipe member 26 the bottom of which is provided the tubular shaped member 212 having a downwardly open longitudinal slot 213 along its length thereof to slidably receive the horizontal pipe section or member 32 of the L-shaped spray unit 30. As shown in FIG. 13, the longitudinal slot 213 is provided to permit passage and clearance for the spray nozzles 36 on the horizontal pipe section 32.

The flexible hose 28 is connected by means of the swivel coupling 111 to the vertical member 26 to supply water and detergent to the L-shaped spray unit 30 through channel 214 shown in dotted outline in FIG. 13, thence through flexible hose 215 the ends of which are provided with couplings 216 and 217. Coupling 216 secure the flexible hose 116 to the undercarriage channel 214 at 218 whereas the coupling 217 is secured to lateral extension 220 of the horizontal pipe section 32 of the L-shaped spray unit 30.

The end of the horizontal pipe member 32 is provided with a counterbalancing weight 221 to compensate for the weight of the L-shaped spray unit 30 when extended from within and under the undercarriage 211.

As shown in FIG. 12, the arcuate travel guide means for the L-shaped spray unit 30 comprises the fluid motor control means generally indicated at 222 and consists of the fluid operated motor 223 to drive the gear 224 which in turn is engageable with the gear rack 225 fixed to the top portion for a substantial longitudinal length of the horizontal pipe section 32 of the L-shaped spray unit 30. The gear 224 is secured to the output shaft 226 of the fluid operated motor 223. The fluid operated motor 223 is of the reversible type and is operated by the fluid servovalve 227, which is provided with an operating lever 228. The end of the lever 228 is provided with a cam follower 230 which engages the outer surface of the cam configuration generally depicted at 231 on the perimetral surface of the cylindrical bearing support 209.

The actuating lever 228 is spring biased toward the cam configuration 231. Necessary fluid lines (not shown) are supplied to the servovalve to supply fluid for operating the reversible motor 223. As the name implies, the servovalve 227, depending upon the amount of displacement posed on the actuating lever 228 by the cam configuration 231, will drive the fluid motor 223 at variable speeds so that the cam configuration 231 may be designed in such a manner that upon the carriage support means 6 reaching the respective ends of its path of travel will cause the undercarriage 211 to rotate and, at the same time because of such cam configuration, operate the servovalve 228 to extend and retract the horizontal pipe section 32 by means of the fluid motor 223, gear 224 and gear rack 225 twice for every half-cycle of rotation of the undercarriage 211. In this manner, the cam configuration 231 is such to cause the fluid operated motor 223 to extend and retract the L-shaped spray unit 30 in a manner to circumscribe a substantial rectangular U-shaped path around the end of the vehicle when the spray unit is caused to be rotated 180° around the ends of the vehicle to be washed as depicted by the dotted line configuration 141 in FIG. 5.

The reversible fluid operated motor 223 may be operated by fluid medium such as oil or the water supplied to the L-shaped spray unit 30 may be used as a fluid medium by having the same pass through the servovalve 227 to operate the motor 223 before passing onto the L-shaped spray unit 30 through the flexible hose 215.

I claim:

1. A vehicle washing apparatus for washing the surface of a vehicle comprising an elongated track positioned horizontally above the vehicle to be washed, a spray head mechanism including inverted L-shaped spray unit adapted to extend above and partly across the vehicle being washed and along the side thereof, carriage support means movably mounted on said track to rotatably support said spray head mechanism, drive means in operative driving connection with said carriage means to control the reciprocal movement of said carriage support means along a designated path of travel on said elongated track, and arcuate travel guide means for said L-shaped spray unit and on said spray head mechanism operative by said drive means when said carriage support means is at each end of its reciprocal path of travel to rotate said L-shaped spray unit 180° around the ends of the vehicle to be washed and to simultaneously cause said unit when so rotated to subscribe a substantially rectangular U-shaped path around said vehicle ends.

2. The vehicle washing apparatus of claim 1 characterized in that said head mechanism includes a second carriage means rotatably supported from beneath said carriage support means to reciprocally support said L-shaped spray unit, means to reciprocate said L-shaped spray unit included in said arcuate travel guide means at each end of said carriage support means path of travel upon rotation of said second carriage means to cause said spray unit to subscribe a substantially rectangular U-shaped path around said vehicle ends.

3. The vehicle washing apparatus of claim 1 characterized in that said head mechanism includes a second carriage means rotatably supported from beneath said carriage support means to reciprocally support said L-shaped spray unit, said arcuate travel guide means includes a rotatable crank arm having one end secured to said L-shaped spray unit and its opposite end secured to coupling means secured to said support carriage means, said crank arm caused to rotate upon rotation of said second carriage means at each end of said carriage support means path of travel to reciprocally move said L-shaped spray unit within said second carriage means to cause said spray unit when rotated 180° around the ends of the vehicle to be washed to subscribe a substantially rectangular U-shaped path around said vehicle ends.

4. The vehicle washing apparatus of claim 3 characterized in that said coupling means includes a large gear secured to said carriage support means, a small gear rotatably mounted on said second carriage means and secured to said opposite end of said crank arm, chain drive means to couple said gears, said small gear caused to rotate upon rotation of said second carriage means to rotate said crank arm and reciprocally move said L-shaped spray unit within said second carriage means to cause said spray unit to subscribe a substantially rectangular U-shaped path around said vehicle ends.

5. The vehicle washing apparatus of claim 4 characterized in that the gear ratio between said large and small gears is 4 to 1 to permit said crank arm to make two revolutions at each end of said carriage support means path of travel upon 180° rotation of said second carriage means.

6. The vehicle washing apparatus of claim 3 characterized in that said drive means includes a conveyor supported at the ends of the carriage support means path of travel and having its ends connected to drive said carriage support means along said track, a first motored drive means to drive said conveyor when said carriage support means is traversing along its path of travel on said track, a second motored drive means to drive said conveyor at a slower rate of speed when said carriage support means is at the ends of its path of travel to rotate said second carriage means with said L-shaped spray unit 180° around an end of the vehicle to be washed, and control means at each end of the carriage support means path of travel disposed for activation by said carriage support means to disengage said first drive means and engage said second drive means.

7. The vehicle washing apparatus of claim 6 characterized in that said conveyor supported at the ends of the carriage support means path of travel includes pulley means mounted above said track at each end of the carriage support means path of travel with their axis vertically disposed relative to said track, one of said pulley means driven by said first drive means and said second drive means.

8. A drive for a vehicle washing apparatus comprising a spray head mechanism including an inverted L-shaped spray unit rotatably supported from a carriage means for reciprocal movement along an elongated track positioned horizontally above the vehicle to be washed, motor means to drive said carriage means along a path of travel on said track, said spray head mechanism comprising bearing means on said carriage means to support a vertical tubular section for rotation, a fluid swivel connected to the top of said vertical tubular section, said L-shaped spray unit secured to the bottom of said vertical tubular section beneath said carriage means, a drive conveyor supported above said track at each end thereof by pulley means with the ends of said conveyor connected to a conveyor connecter on said carriage means, said motor means in driving engagement with one of said pulley means, said conveyor connecter including tensioning means on said carriage to maintain said drive conveyor in a taut condition, said motor means comprising a first motored drive means to move said carriage means along said track and a second motored drive means to rotate said L-shaped spray unit 180° around an end of the vehicle to be washed when said carriage means is at the ends of said track, control switch means adjacent each end of said track for activation by said carriage support means to disengage said first drive means and engage said second drive means.

9. The vehicle washing apparatus of claim 1 characterized in that said head mechanism includes a second carriage means rotatably supported from beneath said carriage support means to reciprocally support said L-shaped spray unit, said arcuate travel guide means includes reversibly hydraulic motor means to reciprocally drive said L-shaped spray unit, servocontrolled valve means to variably operate said hydraulic motor means to cause said L-shaped spray unit when said second carriage means is rotated 180° around the ends of the vehicle to be washed to subscribe a substantially rectangular U-shaped path around said vehicle ends.

10. The vehicle washing apparatus of claim 9 characterized by cam means on said carriage support means operative on said servocontrolled valve means to reversibly drive said hydraulic motor means at variable velocities to cause said L-shaped spray unit to subscribe a substantially rectangular U-shaped path around said vehicle ends.

11. The vehicle washing apparatus of claim 1 characterized in that said drive means includes a conveyor supported at the ends of the carriage support means path of travel and having its ends connected to drive said carriage support means along said track, a first motored drive means to drive said conveyor when said carriage support means is traversing along its path of travel on said track, a second motored drive means to drive said conveyor a at a slower rate of speed when said carriage support means is at the ends of its path of travel to rotate said L-shaped spray unit 180° around an end of the vehicle to be washed, and control switch means at each end of the carriage support means path of travel disposed for activation by said carriage support means to disengage said first drive means and engage said second drive means.

12. The vehicle washing apparatus of claim 1 characterized in that said arcuate travel guide means comprises primary and secondary cam arms secured to said spray head mechanism means disposed within the path of travel of said carriage support means cooperatively interceptive with said arcuate travel guide means and comprising a catch arm adjacent each end of said track to engage said primary cam arm when said carriage support means approaches each end of said track, said catch arm supported in parallel alinement from said track for biased arcuate movement in a horizontal plane and a stationary arm supported from and adjacent of each end of said track and having hinge member to permit passage of said secondary cam arm as said carriage support means approaches each end of said track but to engage said secondary cam arm as said carriage support means digresses from each end of said track.

13. The vehicle washing apparatus of claim 12 characterized in that said spray head mechanism includes a vertical support section to rotatably support said L-shaped spray unit, said L-shaped unit comprising a horizontal pipe section and a vertical pipe section secured to one end of said horizontal pipe section, said primary cam arm mounted on said vertical support section in a plane passing through both said horizontal and vertical pipe sections, grasping means formed on the end of said primary cam arm to intercept and engage said catch arm disposed in the carriage support means path of travel to simultaneously rotate said catch arm and said L-shaped spray unit in the same arcuate direction an arcuate distance of substantially 90° when said carriage support means approaches each end of its path of travel.

14. The vehicle washing apparatus of claim 13 characterized in that said secondary cam arm is mounted on said vertical support section in a plane substantially normal to said plane passing through both said horizontal and vertical pipe sections, a right-angled section on the end of said secondary cam arm to engage said stationary arm to rotate said L-shaped unit an additional arcuate distance of substantially 90° as said carriage support means digresses from each end of its path of travel, thereby completing said substantially rectangular path 180° around the ends of the vehicle to be washed.

15. The vehicle washing apparatus of claim 14 characterized in that said drive means includes a conveyor supported at the ends of said track and having its ends secured to said carriage support means, a reversible motor connected to drive said conveyor and move said carriage support means along its path of travel, and control switch means at each end of the carriage support means path of travel to reverse the operation of said motor and said conveyor.

16. The vehicle washing apparatus of claim 15 characterized by a reversible, variable speed motor connected to drive said conveyor and a second control switch means adjacent each end of the carriage support means path of travel to reduce the speed of said motor and said carriage support means as it approaches and digresses from each end of its path of travel.

17. The vehicle washing apparatus of claim 1 characterized in that said drive means includes a conveyor supported at the ends of said track and having its ends secured to said carriage support means, a reversible motor connected to drive said conveyor and move said carriage support means along its path of travel, and control switch means at each end of the carriage support means path of travel to reverse the operation of said motor and said conveyor.

18. The vehicle washing apparatus of claim 1 characterized in that said spray head mechanism includes a second carriage means rotatably supported from beneath said carriage support means, alined roller means in said second carriage means to reciprocally support said L-shaped spray unit, said arcuate travel guide means includes a closed loop trackway secured to the bottom of said carriage support means, and a guide secured to said L-shaped spray unit for travel within said trackway, said closed loop trackway designed to reciprocally move said L-shaped spray unit within said second carriage means to cause said unit to circumscribe a substantially rectangular path as said L-shaped spray unit is rotated 180° around the ends of the vehicle to be washed.

19. The vehicle washing apparatus of claim 18 characterized in that said closed loop trackway is substantially quadepicycloidal.

20. The vehicle washing apparatus of claim 18 characterized by a vertical tubular section secured to said carriage support means to rotatably support at its bottom end said second carriage means, said arcuate travel guide means including a semicircular carriage stabilizing guide lip concentrically mounted to the upper end of said vertical tubular section, means disposed within the path of travel of said carriage support means to intercept said arcuate travel guide means guide lip and including a bar with a guide roller on its outer end secured at each end of the carriage support means path of travel, said guide roller received within said guide lip to travel therealong as said L-shaped spray unit is rotated 180° around and end of the vehicle to be washed.

21. The vehicle washing apparatus of claim 20 characterized by an intercepting tongue extending radially from said lip to receive said guide roller and guide the same into said guide lip as said carriage support means approaches each end of its path of travel.

22. The vehicle washing apparatus of claim 18 characterized in that said drive means includes a closed loop conveyor supported at the ends of the carriage support means path of travel and having its ends connected to said spray head mechanism, pulley means rotatably supported on vertically disposed axis above each end of said carriage support means path of travel, a motored drive means to drive at least one of said pulley means, said carriage means spray head mechanism rotated substantially 180° when said carriage support means is positioned by said conveyor under said pulley means.

23. The vehicle washing apparatus of claim 22 characterized by a conveyor connecter on said spray head mechanism to receive and hold the ends of said conveyor, tensioning means in said conveyor connecter to provide tension on said conveyor ends, guide abutments on said conveyor connecter and alined parallel guide rails supported between said pulley means to receive said guide abutments to inhibit oscillating movement of said spray head mechanism as said carriage support means travels along said track.